Aug. 31, 1943.　　　　C. H. JONES　　　　2,328,344
WINDING MACHINE
Filed June 16, 1941　　　6 Sheets-Sheet 1

Inventor:
Charles H. Jones
By
Watson, Cole, Grindle & Watson
Attorneys.

Aug. 31, 1943.   C. H. JONES   2,328,344
WINDING MACHINE
Filed June 16, 1941   6 Sheets-Sheet 2

Inventor:
Charles H. Jones
By
Watson, Cole, Grindle & Watson
Attorneys.

Aug. 31, 1943.                C. H. JONES                2,328,344
                            WINDING MACHINE
                        Filed June 16, 1941          6 Sheets-Sheet 3

Inventor:
Charles H. Jones
By
Watson, Cole, Grindle & Watson
Attorneys.

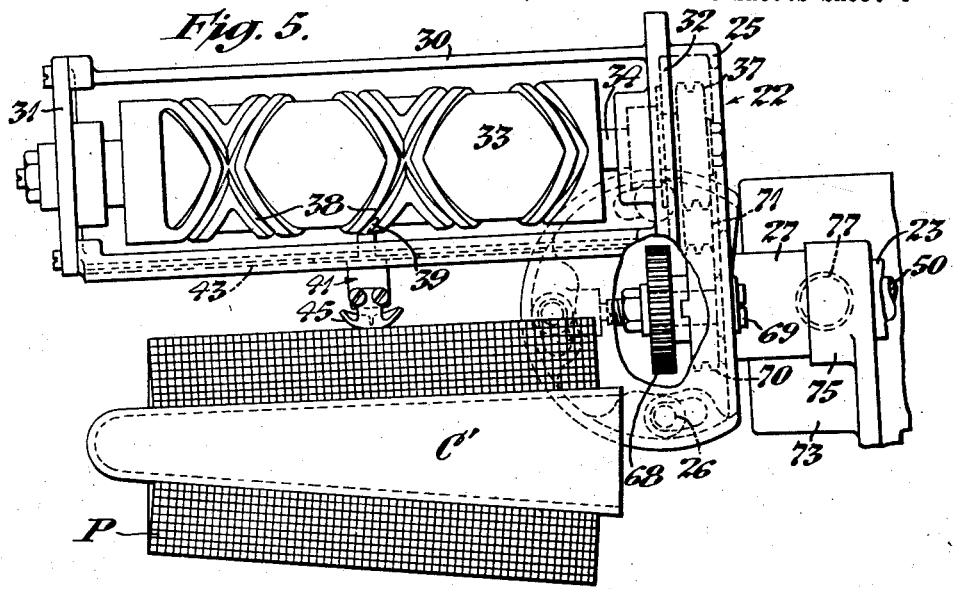
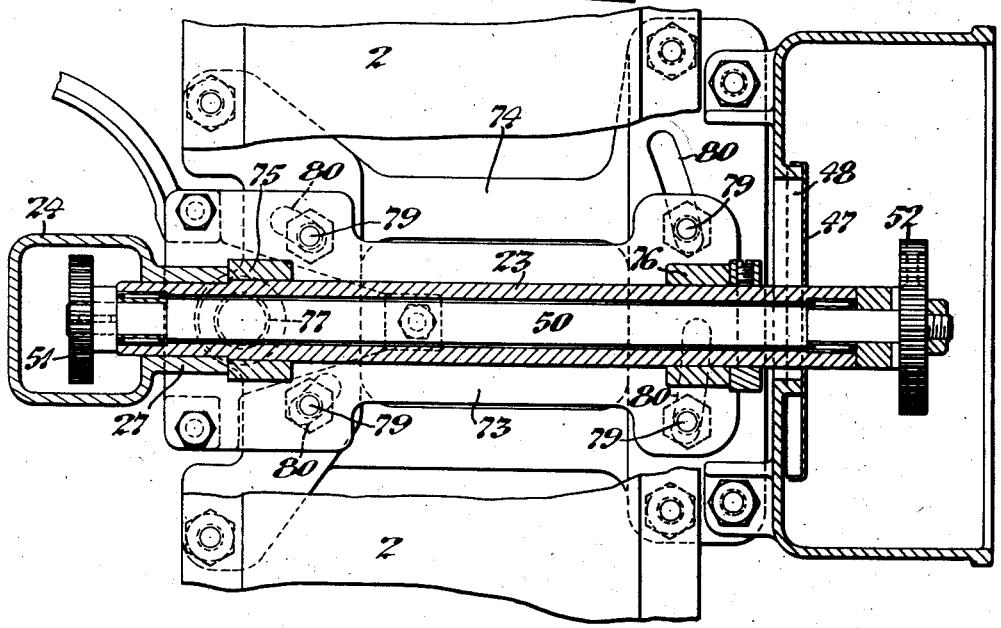
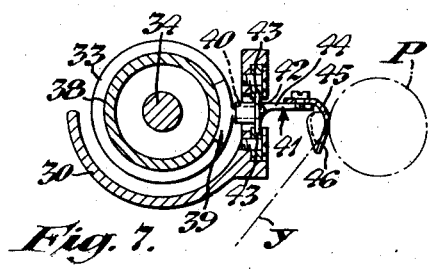

Aug. 31, 1943.   C. H. JONES   2,328,344
WINDING MACHINE
Filed June 16, 1941   6 Sheets-Sheet 5

Inventor:
Charles H. Jones
By
Watson, Cole, Grindle & Watson
Attorneys.

Aug. 31, 1943. C. H. JONES 2,328,344
WINDING MACHINE
Filed June 16, 1941 6 Sheets-Sheet 6

Inventor:
Charles H. Jones
By
Watson, Cole Grindle & Watson
Attorneys.

Patented Aug. 31, 1943

2,328,344

UNITED STATES PATENT OFFICE 2,328,344

WINDING MACHINE

Charles H. Jones, Warwick, R. I., assignor to Universal Winding Company, Boston, Mass., a corporation of Massachusetts Application June 16, 1941, Serial No. 398,358

19 Claims. (Cl. 242—36)

This invention relates to winding machines for winding packages of yarn, thread, cord and other strand materials, hereinafter referred to generally by the term "yarn."

One of the objects of the present invention is to provide a machine of the type indicated which is adjustable to wind both cylindrical and conical packages with the latter formed either with planar or concavo-convex ends.

Another object is to provide a machine of the type indicated having traverse means mounted to rock toward and away from the winding spindle about a pivotal axis parallel with the axis of the spindle and adjustable to any angular relation with respect to its own pivotal axis.

Another object is to provide a machine of the type indicated in which the pivotal axis of the traverse means is angularly adjustable with respect to the axis of the winding spindle.

Another object is to provide a machine of the type indicated having rockable traverse means arranged to be driven from the winding spindle.

Another object is to provide a machine of the type indicated in which the driving means for the traverse means is enclosed in a swinging protective casing.

Another object is to provide a machine of the type indicated in which the winding strand feeds in a straight line to the periphery of the package on which it is wound without bending or diverting it at the thread-guide whereby to provide for a more accurate control of the tension on the yarn.

Another object is to provide a machine of the type indicated having a tension-device which is progressively adjustable by the rocking movement of the traverse means to decrease the applied tension in proportion to the increase in the linear speed of the yarn strand to maintain the ultimate tension on the yarn substantially constant.

Another object is to provide an electric stopping means operated by the rocking movement of the traverse means upon the completion of a package or upon breakage of the yarn or exhaustion of its supply.

Still another object of the invention is to provide a machine of the type indicated having a simple and compact construction and arrangement of the elements and adapted to operate efficiently in performing its intended functions.

Further objects of the invention are set forth in the following specification which describes a preferred form of construction of the machine, by way of example, as illustrated by the accompanying drawings. In the drawings:

Fig. 5 is a plan view similar to Fig. 4 showing the traverse means adjusted to wind a conical package with concavo-convex ends;

Fig. 6 is a sectional plan view taken on line 6—6 of Fig. 2 showing the pivotal support for the traverse means mounted on an adjustable bearing plate and illustrating the relative position of the pivotal support for winding cylindrical packages or conical packages with planar ends;

Fig. 7 is a transverse sectional view taken on line 7—7 of Fig. 2 showing the thread-guide and rotary cam for reciprocating the guide;

Heretofore winding machines have been provided for winding conical packages having planar ends and other machines have been employed for winding conical packages with concavo-convex ends, but no one type of prior art machines has been capable of winding both varieties of conical packages. In certain prior art machines the spindles are sometimes adjustable with respect to the plane of movement of the thread-guide to wind packages of different angular slopes.

The present improved machine comprises, in general, a traverse means or traverse assembly mounted on a pivotal support for rocking movement toward and away from the winding spindle and adjustable relative to the axis of its pivotal support to adapt the machine to wind either cylindrical packages or conical packages having planar ends. In the present machine the pivotal support for the traversing means is also adjustable in angular relation to the axis of the winding spindle to adapt the machine to wind conical packages with concavo-convex ends. The improved construction and arrangement of the thread-guide and tension-device is also such as to adapt the yarn strand to feed in a straight line to the periphery of the package being wound without bending or diverting it at the thread-guide or other points, whereby to permit more accurate control of the tension on the yarn throughout the winding operation. The present invention also contemplates a novel form of electric stopping means for arresting the winding operation upon breakage or exhaustion of the yarn supply and upon completion of a package.

Figure 1:
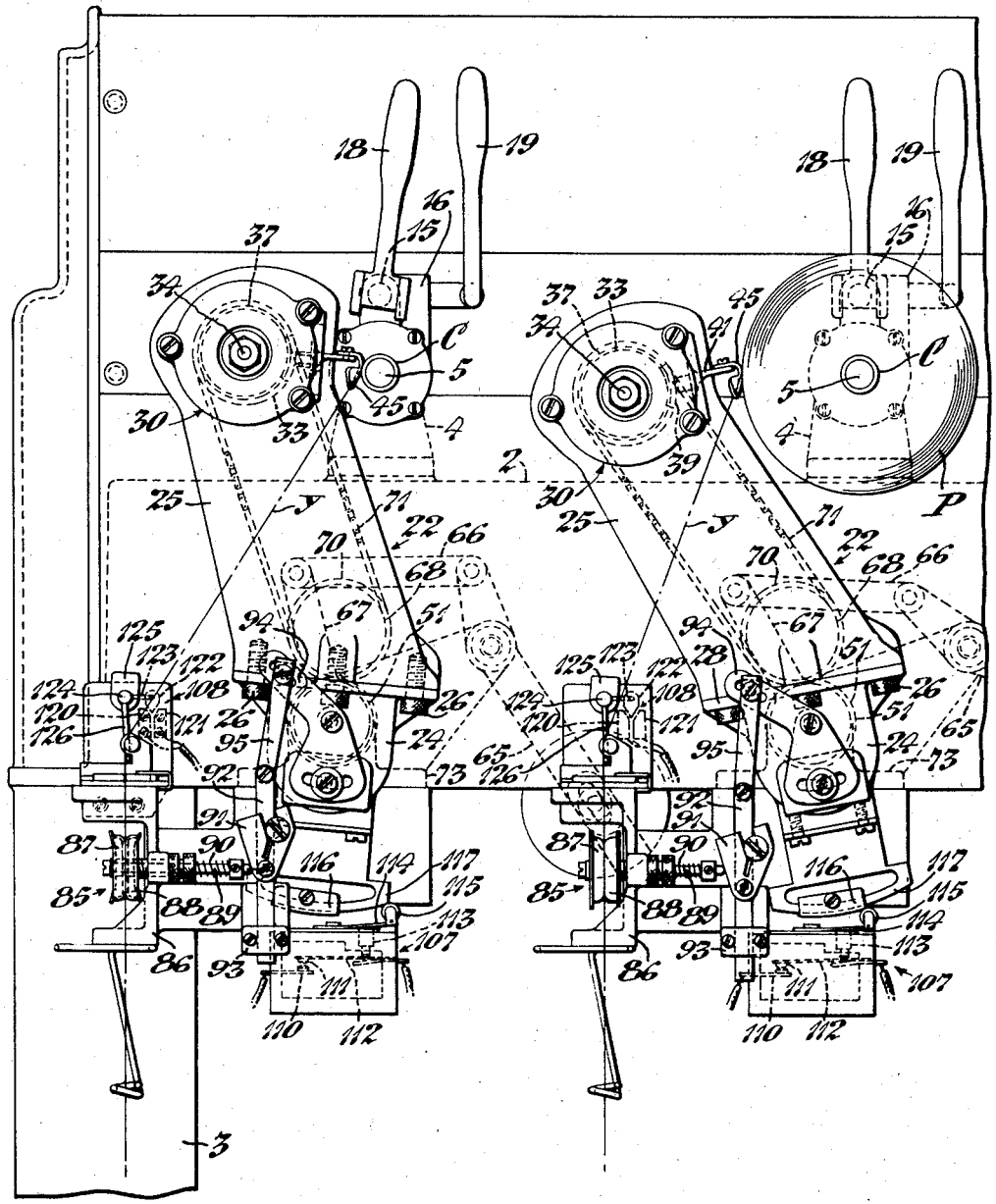
Fig. 1 is a front elevational view of a portion of a winding machine showing two of a series of winding units incorporating the novel features of the present invention.
Figure 2:
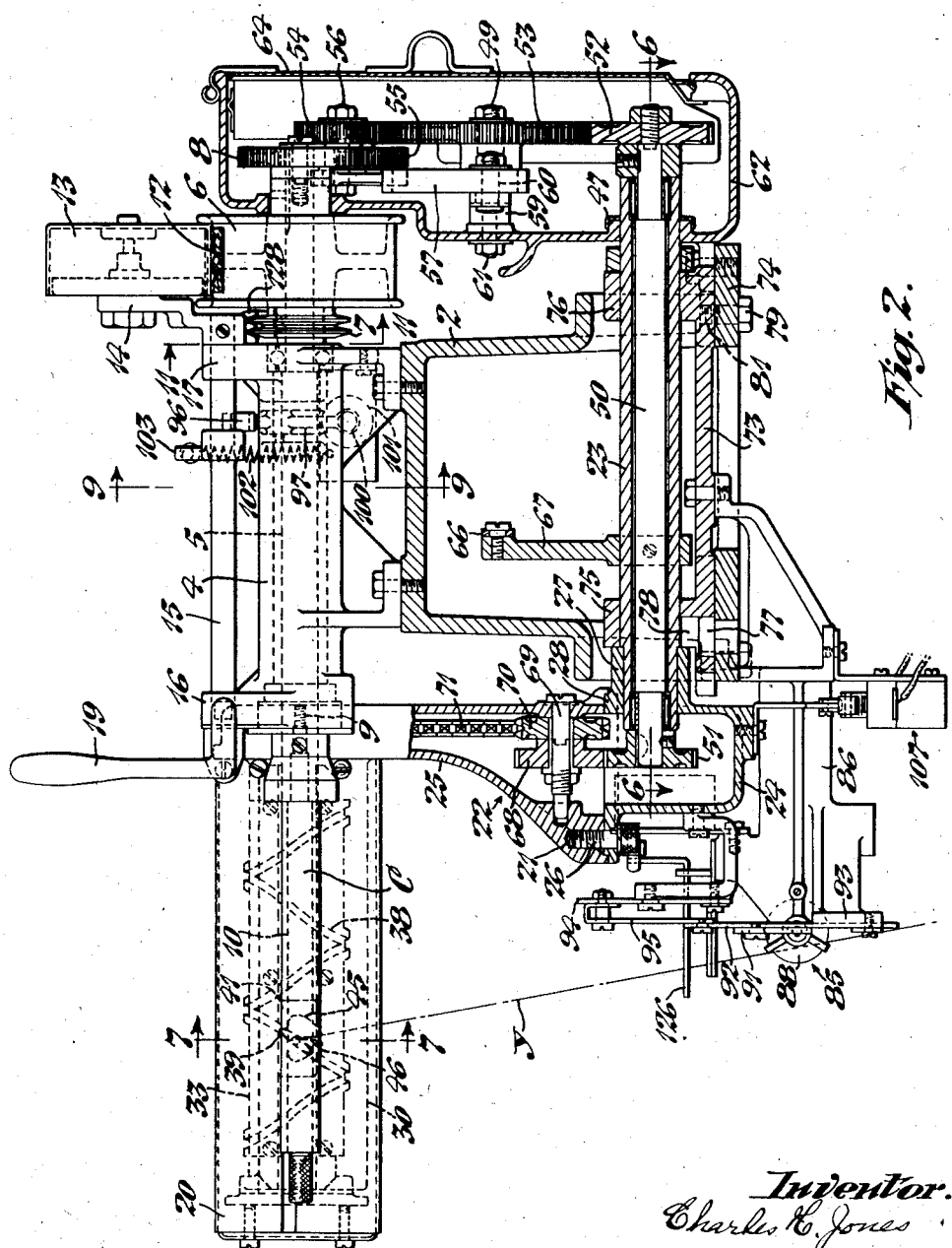
Fig. 2 is a part-sectional view of one winding unit of the machine shown in side elevation and illustrating the pivotal mounting of the traverse means and the drive therefor.

Referring to Figs. 1 and 2 of the drawings, a plurality of winding heads or units are mounted on a bed 2 extending longitudinally throughout the length of the machine and supported on suitable legs 3. Each winding head, only two being illustrated in Fig. 1 of the drawings, comprises a mounting or bracket 4 supporting bearings for a rotary winding spindle 5. As illustrated in Fig. 2 the bracket 4 is bolted to the top of an upstanding platform on the bed 2 and has a tubular body portion with anti-friction bearings at its ends in which the spindle 5 is journaled. One end of the spindle 5 is provided with a threaded bore 9 for receiving the threaded end of a spindle-extension 10 which projects outwardly beyond the front of the machine and is adapted to receive a cylindrical cop-tube C on which the package P is wound; or a cone-tube holder may be substituted therefor for supporting a tapered or conical cop-tube C' shown in Fig. 4. The spindle 5 projects rearwardly from its bearing in the bracket 4 and carries a pulley 6 mounted fast thereon. Between the pulley 6 and bracket 4 is a grooved brake-element 7 keyed to the spindle and at the extreme outer end of the spindle is a gear 8.

Figure 9:
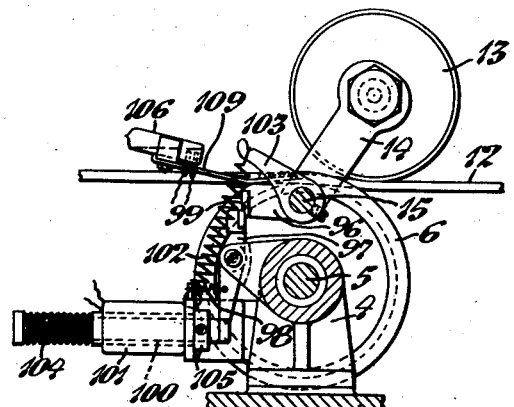
Fig. 9 is a transverse sectional view taken on line 9—9 of Fig. 2 showing the starting and stopping mechanism of the machine and illustrating the driving belt in driving engagement with the pulley on the winding spindle.

The spindles 5 of the several heads are driven from a belt 12 extending longitudinally of the machine frame and held in driving engagement with the peripheries of the pulleys 6 by means of idler pulleys 13, see Fig. 9. The idler pulley 13 for each head is journaled on a stud at the end of an arm 14 carried by a rock-shaft 15, the latter being mounted in bearings 16 and 17 projecting upwardly from the bracket 4, see Fig. 2. Mounted fast on the forward end of the rock-shaft 15 is a starting handle 18 for rocking the idler pulley 13 to the position illustrated in Fig. 9 to engage the drive belt 12 with the pulley 6 on the spindle 5. Preferably, a stationary handle 19 projects upwardly from the bearing 16 to adapt it to be gripped in the fingers with the starting handle 18 so that the latter can be pressed gradually toward the stationary handle to slowly start rotation of the winding spindle 5.

The traverse assembly for guiding and distributing the yarn y on the package P being wound is carried on a rockable frame 22 mounted on a pivotal support in the form of a tube 23 extending horizontally below the spindle 5, see Fig. 2. The traverse frame 22 comprises two hollow casing-sections 24 and 25 bolted together by screws 26. The lower casing section 24 has a laterally-projecting hub 27 which is secured fast on the outer end of the pivotal support 23 with a force fit, see Fig. 2, to connect the parts for rocking movement as a unit. The lower traverse frame section 24 is provided with a laterally-projecting flange 28 at its upper edge having a series of arcuate slots 29 though which the screws 26 extend. The bottom portion of the upper casing section 25 of the traverse frame 22 has a series of tapped holes 21 for receiving the connecting screws 26 and at its upper end is a laterally-extending arm 30 of trough-shape in cross-section, see Fig. 7, with parallel end walls 31 and 32, see Fig. 3. A sheet-metal cover 20, shown in Figs. 2 and 3, encloses the mechanism supported on the arm 30 of the traverse frame 22.

Carried on the traverse frame 22 is a rotary cam-member 33 keyed to a shaft 34 journaled in the end walls 31 and 32 of the arm 30 by means of anti-friction bearings 35 and 36. The inner end of the shaft 34 projects beyond the end wall 32 of the arm 30 into the interior of the hollow casing 25 and carries a sprocket 37 fast thereon. The rotatable cam-member 33 has a cam-track 38 on its periphery in the form of reversing helical grooves for reciprocating a follower or lenticularly-shaped shoe 39. The cam-shoe 39 is provided with a pin or stud 40 projecting forwardly into a bearing in a member 41, see Fig. 7, which is formed with a flange or plate 42 slidable in grooves at the top and bottom of a longitudinal slot 43 in the front of the arm 30. Projecting forwardly from the member 41 is a finger or rest 44 to which is fastened a thread-guide 45. The thread-guide 45 is in the form of a depending concavo-convex flange formed with a central slot 46 through which the yarn strand y is adapted to feed to the winding package. It will be observed by reference to Figs. 1 and 7 that as the winding spindle 5 rotates in clockwise direction the feeding yarn strand y extends to the periphery of the package in a straight line directed toward the top of the package without being bent or diverted from its straight course as it is guided by the thread-guide 45 to traverse the yarn back and forth along the package being wound. Due to this construction and arrangement of the parts the tension on the yarn is not increased or augmented at the thread-guide as the yarn delivers to the winding package.

Figure 8:
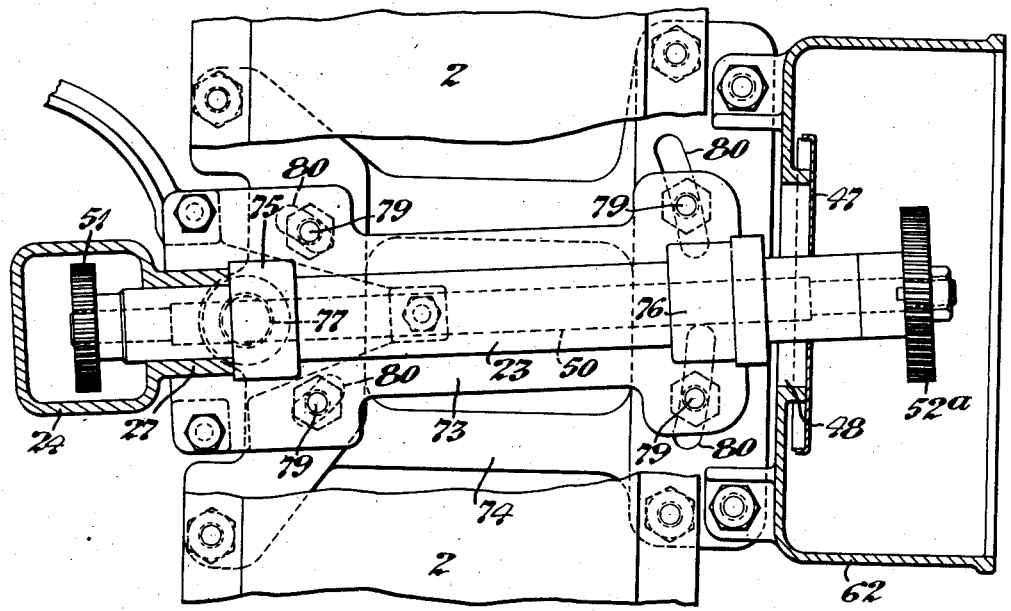
Fig. 8 is a view similar to Fig. 6 showing the means for adjusting the pivotal support for the traverse means to any angular relation with respect to the axis of the winding spindle for winding conical packages with concavo-convex ends.
Figure 13:
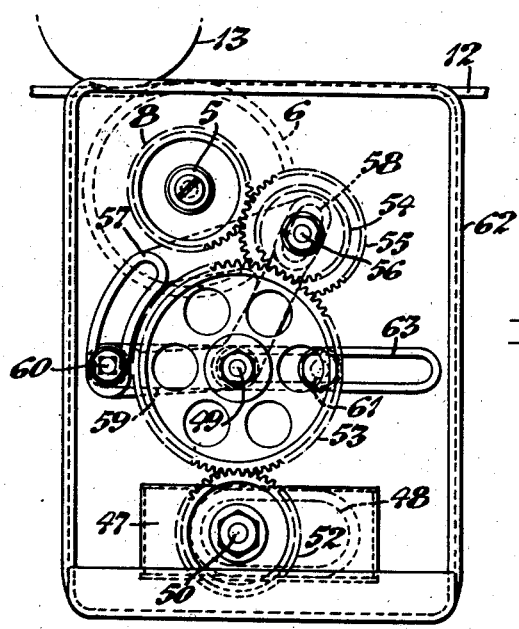
Fig. 13 is an end elevational view of the gear train for driving the traverse means from the winding spindle and constituting a "gainer" mechanism or speed-changing device therefor.
Figures 11, 12:
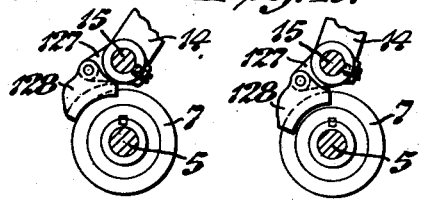
Fig. 11 is a transverse sectional view taken on line 11—11 of Fig. 2 showing the movable brake-shoe disengaged from the brake-disk on the winding spindle.
Fig. 12 is a view similar to Fig. 11 showing the brake-shoe actuated by the stopping means into engagement with the brake-disk on the winding spindle.

The rotary cam 33 is driven from the winding spindle 5 through suitable driving means including a drive shaft 50 journaled in the tubular pivotal support 23 which mounts the traverse frame 22. The ends of the drive shaft 50 project beyond the opposite ends of the pivotal support 23 and carry gears 51 and 52 fast thereon, see Fig. 2. The gear 52 is driven from the gear 8 on the end of the winding spindle 5 through a gear train, see Figs. 2 and 13, constituting a gainer mechanism, so called, for effecting an increment of movement of the thread-guide relative to the package being wound to cause the coils of yarn to be laid in closely adjacent side by side relationship with a "precision" wind as well known to those versed in the art. The gear train comprises a gear 53 in mesh with the gear 52 on the end of the drive shaft 50 and compound gears 54 and 55 which mesh respectively with the gear 53 and the gear 8 on the winding spindle 5. The gear 53 is journaled on a stud 49 and the compound gears 54 and 55 are connected together to rotate on a stud 56 adjustable longitudinally of a radial slot 58 in a polysided bracket 57, see Fig. 13. The bracket 57 is pivotally mounted on the stud 49 and adapted to be clamped in adjusted position on an arm 59 by means of a bolt 60; the arm 59, in turn, being fastened by the stud 49 and a bolt 61 to the rearward wall of a casing 62 enclosing the gear train. As illustrated in Figs. 2 and 13, the stud 49 and bolt 61 project rearwardly through a horizontal slot 63 in the enclosing casing 62 to adapt the arm 59 and bracket 57 for adjustment. By loosening the bolt 60 the bracket 57 may be angularly adjusted to engage the compound gears 54 and 55 with the gears 8 and 53. As illustrated in Fig. 8, the casing 62 is bolted to a platform 74 supported on the bed 2 of the machine frame and is formed at the top with an opening for receiving the rearwardly projecting end of the winding spindle 5, see Fig. 2. The end of the tubular support 23 projects through an elongate opening at the bottom of the casing 62, see Figs. 6 and 13, which is formed with a flange fitted to an oil-guard 47 for preventing the escape of lubricant through the opening 48 in the casing. The casing 62 is also provided with a removable panel 64 to permit access to the gainer mechanism for replacing the compound gears 54 and 55 with others of different ratio to change the speed ratio between the winding spindle and thread-guide in accordance with the size of the yarn to be wound.

The gear 51 at the opposite end of the drive shaft 50 meshes with a gear 68 journaled on a stud 69 extending across the hollow upper section 25 of the traverse frame 22, see Fig. 2. Rotatably connected to the gear 68 is a sprocket 70 which is connected to the sprocket 37 on the cam-shaft 34 by means of a chain 71, see Figs. 2 and 3. Thus the rotary cam 33 is connected to be driven from the winding spindle 5 during the winding operation, and due to the position of the drive shaft 50 at the axis of the pivotal support 23 for the traverse frame 22 the latter is adapted for rocking movement toward and away from the winding spindle 5 without affecting the drive, the gear 68 acting as a planet gear which rotates about the sun gear 51. The traverse frame 22 normally tends to rock in clockwise direction, as viewed in Fig. 1, to yieldingly maintain the thread-guide 45 bearing against the surface of the package P; a counterweighted lever 65, shown by dotted lines in Fig. 1, being connected by a link 66 to an arm 67 projecting radially from the tubular support 23, see Fig. 2, to serve for this purpose.

Figure 3:
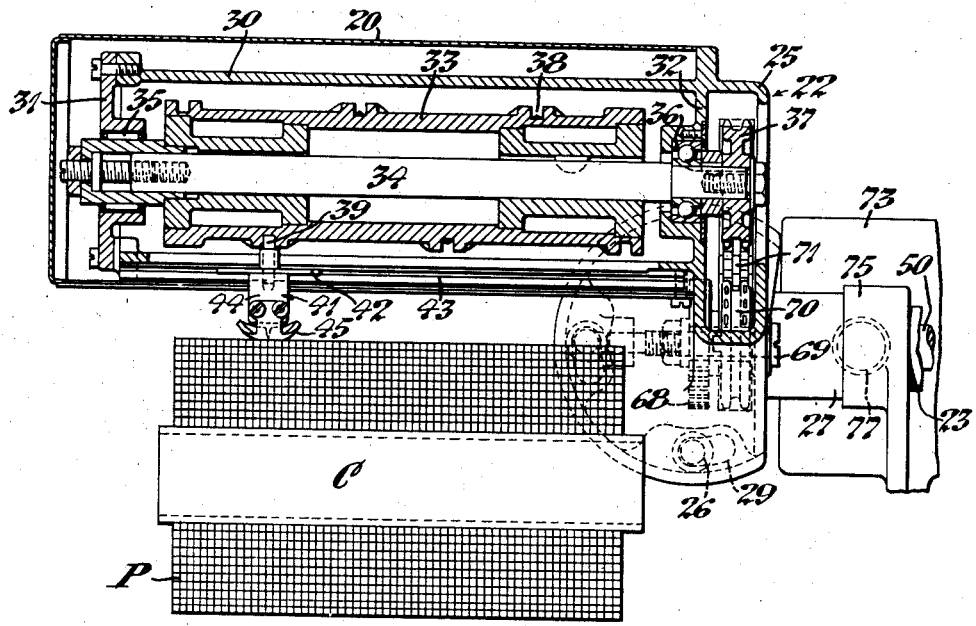
Fig. 3 is a sectional plan view of the traverse means shown as adjusted to wind a cylindrical package and illustrating the rotary cam for reciprocating the thread-guide.
Figure 4:
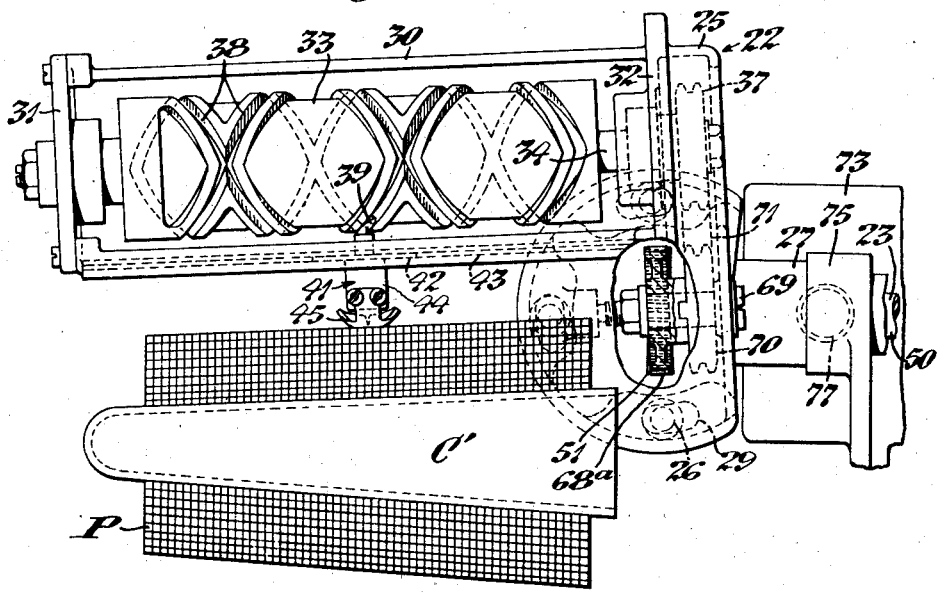
Fig. 4 is a plan view similar to Fig. 3 showing the traverse means adjusted to wind a conical package with flat or planar ends.

In accordance with the present invention the upper casing section 25 of the traverse frame 22 is adapted to be turned with respect to the casing section 24, that is, rotated about a substantially vertical axis, by loosening the connecting screw 26 whereby to position the thread-guide 45 for reciprocatory movement in either parallel or angular relation to the axis of the winding spindle 5. With the pivotal support 23 of the traverse frame 22 arranged parallel to the axis of the winding spindle 5 the machine is adapted to wind either cylindrical packages or conical packages having planar ends as illustrated in Figs. 3 and 4. When the traverse frame 22 is adjusted in angular relation to the axis of the pivotal support 23 to wind a conical package with planar ends a suitable helical gear 68ª, see Fig. 4, is substituted for the spur gear 68 used to wind cylindrical packages; it being understood that this substitution is made in the gearing for driving the cam-shaft 34 from the shaft 50. As the cone packages used in any particular mill are usually of one particular taper, suitable helical gears for the proper setting of the traverse assemblies may be incorporated in the machine as furnished.

It is also a feature of the present invention to provide a machine adapted to wind conical packages having concavo-convex ends of the form illustrated in Fig. 5. To this end the pivotal support 23 for the traverse frame 22 is mounted for angular adjustment with respect to the axis of the winding spindle whereby the traverse assembly is adapted to recede from the winding spindle in a path at right-angles to the surface of the cone-tube on which the package is wound instead of at right-angles to the axis of the spindle. With this last-mentioned arrangement the base of the cone will be formed with a convex end and its apex end will be correspondingly concaved. This type of conical package is preferable for certain uses as it is capable of delivering the yarn freely without resistance liable to be caused by overruns or displaced coils, called "stitches," extending across the base of the cone.

The means for adjusting the pivotal support 23 with respect to the axis of the spindle 5 comprises a bracket or plate 73, see Figs. 2 and 6, having upwardly-extending arms 75 and 76 formed with bearings in which the pivotal support is mounted. The bearing plate 73 seats on the platform 74 which is bolted to the bed 2 of the machine, see Fig. 2. A stud 77 on the platform 74 projects upwardly into a circular recess 78 in the bottom of the bearing plate 73 to form a pivot about which the plate is adapted to swing. After the bearing plate 73 has been adjusted on the platform 74 to position the axis of the pivotal support 23 parallel to the axis of the winding spindle 5, see Fig. 6, or in any angular relation thereto, see Fig. 8, the plate is clamped in fixed position by means of bolts 79 extending through arcuate slots 80 in the platform and threaded into tapped holes 81 in the plate. As illustrated in Figs. 6 and 8 there are four such bolts 79 extending through the arcuate slots 80 and screwed into the bearing plate 73 to insure a firm support for the plate on the platform. When the pivotal support 23 is angularly adjusted with respect to the winding spindle 5 to wind a conical package P, as illustrated in Fig. 5, the casing sections 24 and 25 of the traverse frame 22 are adjusted to locate the axes of the cam-shaft 34 and pivotal support 23 in parallel relationship and a suitable helical gear 52ª is substituted for the spur gear 52 illustrated in Fig. 2. By this novel form of construction the machine is adapted to wind cylindrical packages or conical packages having planar ends by relatively adjusting the sections 24 and 25 of the traverse frame 22;

and in addition it is adapted to wind conical packages having concavo-convex ends by adjusting the pivotal support 23 angularly with respect to the axis of the winding spindle 5.

A tension-device 85, generally similar to that illustrated and described in a copending application for United States Letters Patent, Serial No. 224,386, filed August 11, 1938, now Patent No. 2,253,521, is mounted on a bracket 86 supported from the bearing plate 73, see Figs. 1 and 2. Suffice it to state herein that the tension-device comprises a pair of opposed saucer-shaped disks 87 and 88 between which the yarn strand y feeds as it leads up to the package P. The degree of pressure applied to the tension-disks 87 and 88 is controlled by a plunger 89 under the action of a spring 90, see Fig. 1. The end of the plunger 89 engages the inclined face of a cam-member 91 adjustably mounted on a member 92 which is adapted to slide vertically in a bracket 93. The upper end of the slide 92 is connected to an adjustable arm 94 on the rockable traverse frame 22 by means of a link 95. With this form of construction, as the traverse frame 22 is rocked in counter-clockwise direction, as viewed in Fig. 1, during the growth of the package P the member 92 is slid downwardly by the crank-arm 94 acting through the link 95 to cause the inclined edge of the cam 91 to slide the plunger 89 to the left against the action of the spring 90. Movement of the plunger 89 to the left, as viewed in Fig. 1, relieves the pressure of the tension-disks 87 and 88 on the yarn strand y in proportion to the increase in its linear speed as the package grows in diameter whereby to maintain the ultimate tension on the yarn as it feeds to the package substantially constant; or, if desired, the tension applied to the strand by the tension-device may be reduced to a greater extent during successive stages of the winding by adjusting the cam 91 to dispose its inclined edge at a sharper angle. As a result of the straight line feed of the yarn strand y to the package and the relief of the applied tension concurrently with the increase in its linear speed a more accurate control of the ultimate tension can be obtained than in the prior art constructions in which the yarn is fed upwardly across the thread-guide and then diverted downwardly onto the package.

The winding operation is stopped automatically upon completion of a package P or upon breakage or exhaustion of the yarn supply by an electric stop-motion arranged as next described. Upon rocking movement of the starting handle 18 in clockwise direction, as viewed in Fig. 1, a detent lever 96 fast on the rock-shaft 15 is moved from the position illustrated in Fig. 10 to that illustrated in Fig. 9. Upon movement of the lever 96 to the position illustrated in Fig. 9 a pivoted latching member 97 is automatically rocked in clockwise direction, as viewed in Figs. 9 and 10, by a spring 98 to engage its upper end with a detent-shoulder 99 on the lever 96. The idler pulley 13 is thus retained in the position illustrated in Fig. 9 to maintain the belt 12 in driving engagement with the spindle pulley 6.

The latch-member 97 is adapted to be released from engagement with the shoulder 99 on the lever 96 by the plunger armature 100 of an electromagnet or solenoid 101. The solenoid plunger 100 is of composite construction having a section of non-magnetic material joined to a section of magnetic material to form a continuous length. The plunger extends through the winding of the solenoid 101 and has a head at its outer end. A spring 104 acting between the head of the plunger and the end of the solenoid-supporting frame acts to move the plunger to the position illustrated in Fig. 9, a collar 105 on the plunger limiting its outward movement. Upon energization of the solenoid 101 the magnetic section of the plunger 100 is drawn into the solenoid to cause its right-hand end to rock the latch-member 97 in the manner indicated in Fig. 10. Upon actuation of the latch-member 97 and release of the lever 96 a spring 102, acting between an arm 103 fast on the rock-shaft 15 and a stationary part of the machine frame, will rock the idler pulley 13 from the position illustrated in Fig. 9 to that illustrated in Fig. 10 to arrest the winding operation.

Figure 14:
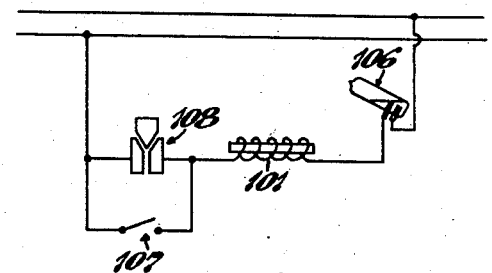
Fig. 14 is a diagrammatic view of the electrical circuit.

As illustrated in Fig. 14, the electrical circuit for the solenoid 101 comprises a mercury switch 106 in series therewith and a pair of switches 107 and 108 in series parallel therewith. Thus, when the mercury switch 106 is tilted to the position illustrated in Fig. 14 the closing of either of the switches 107 or 108 will complete the circuit and cause energization of the solenoid 101. As illustrated in Fig. 9, the mercury switch 106 is mounted on a support 109 carried by the arm 96 on the rock-shaft 15. It will be apparent therefore that movement of the rock-shaft 15 to the position illustrated in Fig. 9 to engage the belt 12 with the spindle-pulley 6 will cause the mercury switch 106 to be tilted to close the contacts, see Fig. 9, while movement of the rock-shaft to the position illustrated in Fig. 10 to release the driving belt from engagement with the pulley causes the mercury switch to be tilted to open the contacts. Thus, when the winding spindle 5 is being driven to wind a package P the switch 106 is closed to condition the circuit to be energized upon closure of either of the switches 107 or 108.

The switch 107, see Fig. 1, is mounted on the bracket 86 below the tension-device 85 and comprises a relatively fixed contact 110 and a movable contact 111 carried at the end of a leaf-spring 112. The leaf-spring 112 is adapted to be flexed by a plunger 113 slidably mounted in the switch-housing and the plunger is arranged to be actuated by a flexible lever 114. The end of the flexible lever 114 carries a roller 115 engageable by an abutment 116 which is adjustable along an arcuate track 117 at the lower end of the rockable traverse frame 22. When the abutment 116 is clamped in predetermined position of adjustment on the track 117, rocking movement of the traverse frame 22 to the left to its extreme position, illustrated at the right in Fig. 1, by the growth of the package P will engage the abutment with the roller 115 on the flexible lever 114 and acting through the plunger 113 will flex the leaf-spring 112 to move the contact 111 against the contact 110 to close the circuit. Thus, the switch 107 is operated upon completion of the winding of a package P to energize the circuit to actuate the stopping mechanism.

The switch 108 is mounted on the bracket 86 above the tension-device 85 and has a pair of stationary spaced contacts 120 and 121 enclosed within a suitable housing and a movable contact 122 adapted to bridge the gap therebetween, see Fig. 1. The movable contact 122 is carried at the end of an arm 123 fast on a shaft 124 rockably mounted in the switch-housing. A weight 125 is mounted on the shaft 124 and is so positioned as to normally overbalance the latter to engage the movable contact 122 with the spaced stationary contacts 120 and 121. Projecting downwardly from the forwardly-projecting end of the shaft 124 is a detector in the form of a wire arm 126 having its lower end bent at right-angles and positioned above the tension-device 85. The yarn strand y leading through the tension-device 85 bears against the detector 126 as it feeds upwardly to the package P to maintain the movable contact 122 raised above the stationary contacts 120 and 121. Upon breakage of the yarn or exhaustion of its supply the detector 126 will be released by the strand y and due to the overbalanced weight 125 the shaft 124 will be rocked to engage the movable contact 122 with the spaced contacts 120 and 121 to bridge the gap therebetween and close the circuit to the solenoid 101.

Figure 10:
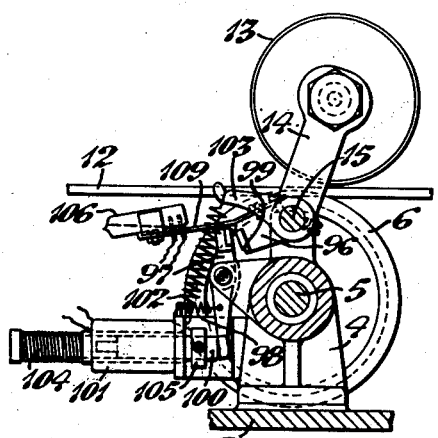
Fig. 10 is a view similar to Fig. 9 showing the electromagnet-operated latch-trip as having been actuated to release the driving belt from engagement with the pulley on the winding spindle.

Upon energization of the solenoid 101 and rocking movement of the latch-member 97 to release the rock-shaft 15 the mercury switch 106 will be rocked from the position illustrated in Fig. 9 to that illustrated in Fig. 10 to open the circuit. The circuit will then remain open until the winding unit is started again by rocking the starting handle 18.

Mounted on a lug 127 projecting from the arm 14 carrying the idler pulley 13 is a brake-shoe 128 adapted to engage the grooved brake-disk 7 on the winding spindle 5. When the idler pulley 13 is rocked to the position illustrated in Fig. 9 to cause the belt 12 to drive the pulley 6 the brake-shoe 128 will be withdrawn from the brake-disk 7; but when the idler pulley 13 is rocked to the position illustrated in Fig. 10 under the action of the spring 102 the brake-shoe will engage the brake-disk on the winding spindle to promptly arrest the rotation of the latter. A preferred embodiment of the invention having now been described in detail the mode of operation of the machine is explained as follows:

The machine is first adjusted to adapt it to wind the particular kind of package desired, such as a cylindrical package or a conical package having either planar or concavo-convex ends. It will be understood that these different types of packages are adapted for use with different kinds of mill equipment or different methods of manufacture. Usually, a particular mill will use only one type of package so that the machine may be furnished with the adjustment necessary for the required form of package; but in some instances, such as in mills where yarn is manufactured for a number of different customers, the adjustment may be changed readily to wind different types of packages for particular requirements.

If a cylindrical form of package P is required the pivotal support 23 for the traverse frame 22 is adjusted to position its axis in parallel relation to the axis of the winding spindle 5 as shown in Figs. 3 and 6. To this end the bolts 79 are loosened and the bearing plate 73 is swung about on the stud 77 as a pivot until the axis of the pivotal support 23 is parallel to the axis of the winding spindle 5, after which the bolts are tightened to clamp the bearing plate in its adjusted position. The upper section 25 of the traverse frame 22 is also adjusted with respect to the lower section 24 to aline the axis of the traverse cam 33 with the axis of the winding spindle 5. This adjustment is accomplished by loosening the screws 26 and turning the upper section 25 of the traverse frame with respect to the lower section 24 until the axis of the cam 33 is parallel to the axis of the winding spindle 5 and then tightening the screws. When so adjusted the thread-guide 45 will be reciprocated by the cam 33 in a plane parallel to the axis of the winding spindle 5 and the cop-tube C mounted thereon, see Fig. 3. As winding progresses the growth in diameter of the package causes the traverse frame 22 and thread-guide 45 to recede from the winding spindle while the path of traverse is maintained parallel to the axis of the spindle to effect the winding of a cylindrical package such as illustrated in section in Fig. 3.

If a conical package having planar ends is desired the upper section 25 of the traverse frame 22 is turned with respect to the lower section 24 to position the axis of the cam 33 at an angle to the axis of the winding spindle 5 corresponding to the taper on the surface of the cop-tube C' on which the package is to be wound. The upper section 25 of the traverse frame 22 is adjusted with respect to the lower section 24 in the manner explained above by loosening the screws 26 and turning the upper section with respect to the lower section, the arcuate slots 29 in the flange 28 of the lower section permitting such relative turning movement. A suitable helical gear 68ª is substituted for the spur gear 68 used when a cylindrical package is being wound to compensate for the angular relationship of the upper and lower sections of the traverse frame. When so adjusted the machine is adapted to wind conical packages having planar ends as illustrated in Fig. 4 as the traverse frame rocks about an axis parallel to the axis of the winding spindle 5.

If a conical package P having concavo-convex ends is required the upper section 25 of the traverse frame 22 is adjusted with respect to the lower section 24 to position the axis of the cam 33 in parallel relation to the axis of the pivotal support 23 or, in other words, in the same relationship as when a cylindrical package is to be wound. It is then necessary to adjust the pivotal support 23 for the traverse frame 22 in angular relationship with respect to the axis of the winding spindle 5 by loosening the bolts 79 and swinging the bearing plate 73 about the stud 77 until the axis of the support lies at an angle to the axis of the winding spindle corresponding to the taper on the surface of the cone to be wound, see Fig. 8. In the types of conical packages P illustrated in Figs. 4 and 5 the taper of the surface of the cone-tube C' is illustrated as approximately three degrees and thirty minutes with respect to the longitudinal axis of the package, but it is to be understood that this taper may be varied through a considerable range. When the pivotal support 23 is angularly adjusted with respect to the axis of the winding spindle 5 a suitable helical gear 52ª is substituted for the spur gear 52 at the right-hand end of the shaft 50, see Fig. 8, to compensate for its angular relation with respect to the gear 53 shown in Fig. 2. When the machine is adjusted in the manner as last explained, the traverse frame 22 will recede from the winding spindle 5 in a path at right-angles to the surface of the cone-tube C', whatever its taper, instead of at right-angles to the axis of the winding spindle 5 to form the conical package P with concavo-convex ends as illustrated in Fig. 5.

After the machine has been adjusted to wind the particular type of package required the yarn strand y is drawn up from its source of supply, not herein shown, inserted between the disks 87 and 88 of the tension-device 85, and thence led across the right-angular end of the detector 126. The end of the strand y is attached to the cop-tube C or C', as the case may be, and the machine is ready to wind. The winding operation is started by pressing the handle lever 18 toward the stationary handle 19, see Fig. 1, to turn the rock-shaft 15 in clockwise direction from the position illustrated in Fig. 10 to that illustrated in Fig. 9 to cause the idler pulley 13 to depress the driving belt 12 into engagement with the pulley 6 on the winding spindle 5. When the rock-shaft 15 is rocked to the position illustrated in Fig. 9 the latch-member 97 is rocked by the spring 98 to engage its end with the detent-shoulder 99 on the lever 96 to hold the belt 12 in driving engagement with the pulley 6. Rocking movement of the arm 96 also rocks the mercury switch 106 to condition the electric stopping mechanism for operation.

Rotation of the winding spindle 5 causes the yarn y to be wound on the periphery of the cop-tube C or C' as the strand is automatically picked up in the slot 46 of the thread-guide 45. The yarn will thus be traversed longitudinally of the package by the reciprocation of the thread-guide 45 to cause it to be laid in helical coils which are disposed in closely adjacent relationship to produce a precision or "Universal" wind in the manner known to those versed in the art. The cam 33 for reciprocating the thread-guide 45 is driven from the winding spindle 5 through the gear train comprising the gears 8, compound gears 54 and 55, gear 53 and gears 52 or 52ª, drive shaft 50, gears 51 and 68 or 68ª, sprocket 70, chain 71 and sprocket 37.

Should the yarn break or its supply become exhausted the detector 126 will be released to rock in clockwise direction, as viewed in Fig. 1, due to the overbalanced weight 125. This movement of the detector 126 will carry the movable contact 122 into engagement with the stationary contacts 120 and 121 of the switch 108. Upon closing the circuit at the switch 108 the solenoid 101 will be energized to move the plunger 100 from the position illustrated in Fig. 9 to that illustrated in Fig. 10 whereby to rock the latch-member 97 and release the lever 96 on the rock-shaft 15. Upon release of the lever 96 the rock-shaft 15 will be rocked in counter-clockwise direction by the spring 102 to raise the idler pulley 13 to the position illustrated in Fig. 10, thereby disengaging the driving belt 12 from the pulley 6 and engaging the brake-shoe 128 with the brake-disk 7 to arrest the winding operation. It will be necessary then to piece up the yarn and start operation of the machine by rocking the handle 18.

As the winding operation progresses the traverse frame 22 rocks in counter-clockwise direction, as viewed in Fig. 1, due to the diametrical growth of the package. Upon completion of a package P to the predetermined size the abutment 116 on the traverse frame 22 will depress the flexible lever 114 to cause the plunger 113 to flex the leaf-spring 112 to engage the contact 111 with the contact 110 of the switch 107 and energize the solenoid 101 to arrest the winding operation. Upon completion of the winding of a package it is removed from the cop-holder on the forwardly-projecting extension of the spindle 5, an empty cop-tube C or C' substituted therefor and the winding started again in the manner as explained previously.

It will be observed from the foregoing that the present invention provides a winding machine adapted to wind interchangeably cylindrical packages or conical packages having either planar or concavo-convex ends. It will be observed also that the present invention provides a novel construction and arrangement of elements in a winding machine for providing a more accurate control of the tension on the yarn being wound to maintain it either substantially constant at the package throughout the winding operation, or to progressively reduce the tension through different stages of the winding operation. It will be observed still further that the present invention provides a novel form of electric stop-mechanism for arresting the winding operation when the package is completed to a given size or should the yarn strand break or its supply become exhausted.

While a preferred form of the improved machine is herein shown and described, it will be understood that modifications may be made in the construction and arrangement of the parts thereof without departing from the spirit or scope of the invention. Therefore, without limiting myself in this respect, I claim:

1. In a machine of the type indicated, a winding spindle, a traverse frame mounted to move toward and away from the winding spindle, a rotary cam carried by the traverse frame for movement therewith toward and away from the spindle, means for driving the winding spindle and traverse cam, and a thread-guide slidable on the traverse frame and connected to be reciprocated by the cam carried by said frame.

2. In a machine of the type indicated, a winding spindle, a traverse frame, means for pivotally mounting the traverse frame to swing toward and away from the winding spindle, a thread-guide slidable on the traverse frame to adapt it to bear against a package wound on the spindle, a cam having a helical track extending in opposite directions, means for rotatably supporting the cam on the traverse frame in spaced relation to the pivotal axis thereof, and means connecting the cam and thread-guide to reciprocate the latter on the traverse frame.

3. In a machine of the type indicated, a winding spindle, a traverse frame, means for pivotally mounting the traverse frame to swing toward and away from the winding spindle, a thread-guide slidably mounted on the traverse frame to adapt it to bear against a package wound on the spindle, a cam journaled in bearings on the traverse frame in spaced relation to the pivotal axis thereof and connected to the thread-guide to reciprocate the latter, a shaft passing through the pivot mounting for the traverse frame, and gearing connecting said shaft with the winding spindle and the cam to cause the thread-guide to be reciprocated by the cam in predetermined ratio with respect to the rotation of the winding spindle.

4. In a machine of the type indicated, a winding spindle, a pivotal support located in spaced relation to the spindle, traverse means mounted on the pivotal support for rocking movement toward and away from the spindle, means for operating the traverse means to traverse the yarn longitudinally of the winding spindle, and means for adjusting the pivotal support angularly with respect to the axis of the winding spindle whereby to adapt the machine to wind either cylindrical packages or conical packages having concavo-convex ends.

5. In a machine of the type indicated, a winding spindle, a pivotal support disposed in spaced relation to the spindle, traverse means mounted on the pivotal support for rocking movement toward and away from the spindle, means for operating the traverse means to traverse yarn longitudinally of the winding spindle, means for bodily adjusting the traverse means to different positions in angular relation to the axis of the pivotal support to wind conical packages having planar ends, and means for adjusting the pivotal support angularly with respect to the axis of the winding spindle to wind conical packages having concavo-convex ends.

6. In a machine of the type indicated, a winding spindle, a pivotal support located in spaced relation to the spindle, a traverse frame mounted on the pivotal support for rocking movement toward and away from the spindle, a thread-guide reciprocable on the traverse frame, a rotary cam mounted on the traverse frame in spaced relation to the pivotal support and connected to reciprocate the thread-guide, and means for driving the rotary cam from the winding spindle to reciprocate the thread-guide, said traverse frame having two relatively adjustable parts to adapt the thread-guide to be reciprocated in a path parallel to or in angular relation to the axis of the spindle whereby to wind either cylindrical or conical packages having planar ends.

7. In a machine of the type indicated, a winding spindle, a pivotal support located in spaced relation to the spindle, a traverse frame mounted on the pivotal support for rocking movement toward and away from the spindle, a thread-guide reciprocable on the traverse frame, a rotary cam on the traverse frame for reciprocating the thread-guide, and means for driving the rotary cam from the winding spindle to reciprocate the thread-guide, said traverse frame having separate casing parts connected to each other in a transverse plane and enclosing the rotary cam and driving means therefor and said casing parts being relatively adjustable to adapt the thread-guide to be reciprocated in a path parallel to or in angular relation to the axis of the spindle.

8. In a machine of the type indicated, a frame, a winding spindle on the frame, a pivotal support located in spaced relation to the spindle, a mounting for the pivotal support adjustable on the machine frame to locate the pivotal support in different positions of angular relation to the winding spindle, a traverse frame mounted on the pivotal support for rocking movement toward and away from the spindle, and means carried by the traverse frame for traversing the yarn longitudinally of the winding spindle, whereby to adapt the machine to wind cylindrical packages or conical packages with concavo-convex ends.

9. In a machine of the type indicated, a winding spindle, a tubular support, a traverse frame pivotally mounted on the tubular support for rocking movement toward and away from the spindle, a thread-guide reciprocable on the traverse frame, a drive shaft journaled in the tubular support, and means actuated from the drive shaft for reciprocating the thread-guide.

10. In a machine of the type indicated, a winding spindle, a tubular support, a traverse frame pivotally mounted on the tubular support for rocking movement toward and away from the spindle, a thread-guide reciprocable on the traverse frame, a rotary cam on the traverse frame for reciprocating the thread-guide, a drive shaft journaled in the tubular support, means comprising a chain connecting the drive shaft and rotary cam to reciprocate the thread-guide, and means for mounting the tubular support, said last-named means being adjustable to position the tubular support in parallel or angular relation to the winding spindle whereby to adapt the machine to wind either cylindrical packages or conical packages with concavo-convex ends.

11. In a machine of the type indicated, a winding spindle, a tubular support, a traverse frame pivotally mounted on the tubular support for rocking movement toward and away from the winding spindle, a thread-guide reciprocable on the traverse frame, a drive shaft journaled in the tubular support, means driven from the drive shaft for reciprocating the thread-guide, said traverse frame comprising separate parts angularly adjustable to adapt the thread-guide to reciprocate in a path either parallel to or in angular relationship with respect to the axis of the winding spindle, and means for adjusting the tubular support in angular relation to the axis of the winding spindle to adapt the machine to wind cylindrical packages or conical packages with planar or concavo-convex ends.

12. In a machine of the type indicated, a winding spindle, a tubular support, a traverse frame pivotally mounted on the tubular support for rocking movement toward and away from the winding spindle, a thread-guide reciprocable on the traverse frame, a rotary cam on the traverse frame arranged in spaced relation to the pivotal axis thereof and connected to reciprocate the thread-guide, a drive shaft journaled in the tubular support, and means connecting the drive shaft to drive the rotary cam.

13. In a machine of the type indicated, a winding spindle, a pivotal support in spaced relation to the winding spindle, a traverse frame mounted on the pivotal support for rocking movement toward and away from the spindle, and a thread-guide reciprocable on the traverse frame and having a depending bifurcated flange adapted to bear against the package being wound, said depending bifurcated flange providing a slot through which the yarn strand is adapted to feed in a straight line to the periphery of the package being wound.

14. In a machine of the type indicated, a winding spindle, a pivotal support spaced from the spindle, a traverse frame mounted on the pivotal support for rocking movement toward and away from the spindle, a thread-guide reciprocable on the traverse frame and having a depending bifurcated flange adapted to bear against the package being wound, said bifurcated flange of the thread-guide providing a slot through which the yarn strand is adapted to feed in a straight line to the periphery of the package, a tension-device below the thread-guide, and means operated by the rocking movement of the traverse frame for progressively adjusting the tension-device to reduce the tension applied to the yarn in proportion to its increase in linear speed whereby to accurately control the tension on the strand at the winding package.

15. In a machine of the type indicated, a winding spindle, a pivotal support spaced from the winding spindle, a traverse frame mounted on the pivotal support for rocking movement toward and away from the winding spindle, a reciprocable thread-guide on the traverse frame, means for driving the winding spindle, means driven from the winding spindle for reciprocating the thread-guide, means for disconnecting the winding spindle from the driving means, an electromagnet for operating the last-named means, an electric circuit for the electromagnet, a switch in said circuit, and means operated by the traverse frame during the rocking movement of the latter away from the winding spindle to actuate the switch whereby to energize the electromagnet and arrest the winding operation.

16. In a machine of the type indicated, a winding spindle, a pivotal support spaced from the winding spindle, a traverse frame mounted on the pivotal support for rocking movement toward and away from the winding spindle, a reciprocating thread-guide on the traverse frame, means for driving the winding spindle, means driven from the winding spindle for reciprocating the thread-guide, means for disconnecting the winding spindle from the driving means, an electromagnet for operating the last-named means, an electric circuit for the electromagnet, a switch in said circuit, and a detector engaged by the yarn strand being wound and adapted to close the switch upon breakage of the yarn or exhaustion of its supply to energize the electromagnet and arrest the winding operation.

17. In a machine of the type indicated, a winding spindle, a pivotal support spaced from the winding spindle, a traverse frame mounted on the pivotal support for rocking movement toward and away from the winding spindle, a reciprocable thread-guide on the traverse frame, means for driving the winding spindle, means driven from the winding spindle for reciprocating the thread-guide, means for disconnecting the winding spindle from the driving means, an electromagnet for operating the last-named means, an electric circuit for the electromagnet, a pair of switches arranged in parallel in said circuit, means on said traverse frame operable by the rocking movement of the latter away from the winding spindle to actuate one of the switches, and a detector engaged by the yarn strand being wound and adapted to close the other switch upon breakage of the yarn or exhaustion of its supply whereby the winding operation will be arrested upon completion of a package or upon breakage of the yarn or exhaustion of its supply.

18. In a machine of the type indicated, a winding spindle, a traverse frame pivoted to swing toward and away from the winding spindle, a tension-device arranged in spaced relation to the winding spindle, a thread-guide reciprocable on the traverse frame and having a slot therein through which the yarn strand leading from the tension-device to the package will feed in a straight line tangent to the periphery of the package without being bent or diverted to alter its straight course, and means for reciprocating the guide.

19. In a machine of the type indicated, a winding spindle, a traverse frame pivoted to swing toward and away from the winding spindle, means below the winding spindle for guiding a yarn strand feeding from its supply to cause it to lead therefrom in a straight line tangent to the periphery of the package, a reciprocable guide for traversing the strand on the package, said guide being adapted to engage the yarn strand without bending or diverting it from its straight course tangent to the periphery of the package, and means for reciprocating the thread-guide.

CHARLES H. JONES.